Oct. 1, 1957  F. J. DUCHÉ  2,808,451
INSULATORS
Filed Jan. 23, 1952

INVENTOR
FREDERIC JEAN DUCHÉ
by Adams + Bush
ATTORNEYS

United States Patent Office 2,808,451
Patented Oct. 1, 1957

2,808,451

INSULATORS

Frederic Jean Duché, Paris, France, assignor to Compagnie Generale d'Électro-Ceramique, Paris, France, a corporation of France Application January 23, 1952, Serial No. 267,745

Claims priority, application France January 23, 1951

7 Claims. (Cl. 174—188)

In patent application Serial No. 150,633, filed March 20, 1950, now abandoned, the applicant has described an insulator of the link type in which the cylindrical reinforcements were adhesively secured on a cylindrical surface, the adhesive layer working in shear when the insulator is acted upon by a tractive force.

This form of the connection of the ceramic to the reinforcement has proved to be one of the best, provided that certain precautions are taken which are set out herein.

In order to achieve a satisfactory adherence of the ceramic to the cylindrical reinforcement, it is important that the latter has a certain degree of elasticity. Actually, when making the adhesive connection, which is carried out under heat with the usual adhesives, the cylindrical part of the reinforcement exerts on the ceramic, as it cools, a binding stress which must be kept within acceptable limits.

According to the invention there is provided an insulator comprising at least one ceramic part, at least one cylindrical tubular reinforcement member surrounding said ceramic part for a portion of its length, said tubular member having a thin elastic wall, and an adhesive bonding between said ceramic part and said wall of cylindrical reinforcement member.

More specifically, according to the present invention, an insulator is provided which comprises, in addition to the ceramic part, at least one metallic reinforcing member, this reinforcing member being constituted of a rigid base spaced from the ceramic part and an elastic tubular cylindrical part surrounding the ceramic part over the portion of the height thereof, with a connecting layer of an adhesive of any suitable type possessing great resistance to tensile and shearing stresses between a ceramic part and the elastic tubular part. The adhesive may be an epoxy resin, for example, of the type described in French Patent No. 930,609 of July 13, 1946, and/or of its three "addition" Patents No. 57,612 of July 10, 1947, No. 57,655 of July 17, 1947, and No. 57,737 of October 17, 1947.

This elasticity may be obtained, among other processes, by arranging that the thickness of the cylindrical element has a minimum value compatible with the mechanical resistance to be obtained or by forming longitudinal slots.

For a better understanding of the invention and to show how the same may be carried into effect, reference will now be made to the accompanying drawing in which.

Figure 1:
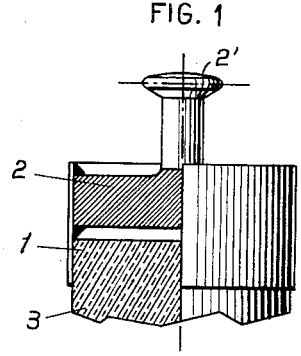
Figure 1 is a half sectional view of an insulator.

Figure 1 shows an insulator comprising a reinforcement or metal fitting constituted by a thin metal tube 1 soldered to a thick plate 2 provided with a coupling device 2', the reinforcement constituted by the parts 1 and 2 being adhesively secured to the ceramic insulator 3 over the circumference of the cylindrical part of the tube 1 bearing on the insulator 3.

Figure 4:
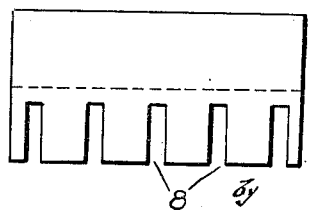
Figure 4 is a view of a metal reinforcing member.

As shown in Figure 4, the tube 1 may be formed with slots 8 directed according to the generatrices of the cylinder and more especially these slots may be extended as far as the bottom end of the cylinder over at least the full height of the sticking area.

Figure 2:
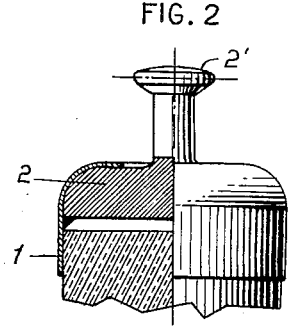
Figure 2 is a half sectional view of another constructional form of insulator.

Figure 2 shows another embodiment in which the thin tube 1, with or without slots, is stamped to conform to the shape of the plate 2 provided with a coupling device 2' and soldering to said plate.

The cap or metal fitting may be finished before being adhesively secured to the ceramic by soldering of the parts which constitute it; or the tubular part of the reinforcement may be initially stuck to the ceramic and then, after this operation a plate may be fixed to this tube by soldering or by any other process.

When sticking the ceramic on the tube, it is necessary to ensure that the adhesive layer does not go beyond the cylindrical surface. In other words, in order to avoid the setting up of unfavourable internal tensions in the ceramic, it is not necessary for the reinforcement to be adhesively secured to the ceramic over the reinforcement's entire internal surface, but only on the cylindrical contact surface. It is possible to preserve a portion of the ceramic surface from the adhesive by coating it with a substance such as wax.

Figure 3:
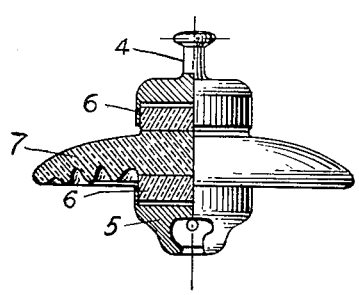
Figure 3 is a half sectional view of yet another constructional form of insulator.

Another particularly advantageous form of sticking the metal reinforcement to a ceramic insulator is shown in Figure 3. It consists in initially sticking or securing the metal fittings or reinforcements 4 and 5 suitably formed, for example, similar to corresponding elements 2 and 2' of Figures 1 and 2 and which are provided with cylindrical bearing surfaces similar to bearing surfaces 1 of Figures 1 and 2 and formed integrally therewith or suitably secured thereto, to the cylindrical ceramic elements 6 and then sticking these elements to the main body of the insulator 7. Experience has shown that it is even preferable to effect the sticking of the ceramic to the metal reinforcements by means of cylindrical surfaces, the ceramic-ceramic adhesion may without disadvantage be effected by means of plane surfaces. The elements 6 have a coefficient of expansion between that of the main body 7 and that of the reinforcements.

The mechanical and electrical properties of insulators thus formed by several ceramic elements stuck together are comparable with those of insulators made of a single ceramic unit, but the conditions for manufacturing and fixing the brackets are greatly improved.

I claim:

1. An insulator comprising at least one solid cylindrical ceramic element, a rigid circular metal disc spaced from said solid ceramic element, a cylindrical metal tube surrounding said metal disc and surrounding said ceramic element for part of its length, a solder joint between the metal disc and the metal tube, and a connecting layer employing an adhesive having great resistance to tensile and shearing stresses between said ceramic element and said tube.

2. An insulator according to claim 1, in which said metal tube is stamped to the shape of the metal disc.

3. An insulator comprising at least one solid ceramic part and at least one metallic fitting, said metallic fitting including a rigid base spaced from said ceramic part in the axial direction thereof and an elastic cylindrical tubular part surrounding said ceramic part, said cylindrical tubular part being rigidly secured to said rigid base, and means including a connecting layer of an adhesive resistant to shearing stresses and disposed between said ceramic part and said elastic cylindrical tubular part for adhesively connecting a portion of said cylindrical part with said ceramic part.

4. An insulator according to claim 3, further comprising longitudinal slots extending over at least the full height of the adherent portion of said cylindrical tubular part.

5. An insulator according to claim 3, wherein said ceramic part consists of several elements bonded together.

6. An insulator according to claim 3, wherein the generatrix of the internal wall of said elastic tubular part is straight.

7. An insulator according to claim 3, wherein the elastic tubular part has a thickness which is less than that of said rigid base to give it elasticity.

References Cited in the file of this patent

UNITED STATES PATENTS

| | | |
|---|---|---|
| 1,273,015 | Thomas | July 16, 1918 |
| 1,477,800 | Austin | Dec. 18, 1923 |
| 2,262,831 | Burleson | Nov. 18, 1941 |

FOREIGN PATENTS

| | | |
|---|---|---|
| 391,370 | Germany | Mar. 5, 1924 |